United States Patent
Sauber et al.

(10) Patent No.: US 7,685,477 B2
(45) Date of Patent: Mar. 23, 2010

(54) SYSTEM AND METHOD FOR AUXILIARY CHANNEL ERROR MESSAGING

(75) Inventors: William F. Sauber, Georgetown, TX (US); Rocco Ancona, Austin, TX (US); Muhammed K. Jaber, Austin, TX (US); Bruce A. Miller, Plano, TX (US); Adolfo S. Montero, Austin, TX (US); Margaret G. Reed-Lade, Austin, TX (US); Jeff A. Rose, Manor, TX (US); Andrew T. Sultenfuss, Leander, TX (US); Larry White, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 708 days.

(21) Appl. No.: 11/298,007

(22) Filed: Dec. 9, 2005

(65) Prior Publication Data

US 2007/0168763 A1  Jul. 19, 2007

(51) Int. Cl.
*G06F 11/00* (2006.01)
(52) U.S. Cl. .......................... 714/57; 714/46
(58) Field of Classification Search .................. 714/46, 714/57
See application file for complete search history.

(56) References Cited

U.S. PATENT DOCUMENTS

| | | | |
|---|---|---|---|
| 5,097,213 A | 3/1992 | Hunting et al. ............. 324/538 |
| 5,307,354 A | 4/1994 | Cramer et al. ............. 371/11.2 |
| 5,748,880 A | 5/1998 | Ito et al. ................. 395/183.22 |
| 6,000,046 A | 12/1999 | Passmore ...................... 714/57 |
| 6,145,102 A | 11/2000 | Klein et al. .................... 714/47 |
| 6,211,909 B1 | 4/2001 | Macshima et al. .......... 348/207 |
| 6,269,460 B1 | 7/2001 | Snover ........................ 714/48 |
| 6,342,840 B1 | 1/2002 | Dunn ......................... 340/585 |
| 6,505,348 B1 * | 1/2003 | Knowles et al. ............... 725/49 |
| 6,657,548 B2 | 12/2003 | Dai ......................... 340/15.45 |
| 6,845,277 B1 * | 1/2005 | Michelet et al. ............... 700/83 |
| 7,088,741 B2 * | 8/2006 | Kobayashi .................. 370/522 |
| 2002/0060286 A1 * | 5/2002 | Karasawa ................... 250/235 |
| 2006/0205507 A1 * | 9/2006 | Ho .............................. 463/39 |

\* cited by examiner

*Primary Examiner*—Scott T Baderman
*Assistant Examiner*—Jigar Patel
(74) *Attorney, Agent, or Firm*—Hamilton & Terrile, LLP; Robert W. Holland

(57) ABSTRACT

Information handling system errors are presented at a display with the information handling system graphics subsystem inoperative by communicating an identified error to the display through an auxiliary channel and generating a presentation of the error information with a microcontroller of the display. For example, errors determined by BIOS firmware running on a chipset are communicated through a DDC or I2C channel from the chipset to the display so that textual error messages are generated at the display without the use of the information handling system's graphic processor to generate an error message image.

21 Claims, 3 Drawing Sheets

SYSTEM AND METHOD FOR AUXILIARY CHANNEL ERROR MESSAGING

BACKGROUND OF THE INVENTION

1. Field of the Invention

The present invention relates in general to the field of information handling system error messaging, and more particularly to a system and method for error messaging through a display auxiliary channel.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems typically present information as visual images at a display, such as a CRT or a flat panel display. Visual information generated by processing components of an information handling system is typically communicated to the display with a standardized cable, such as a VGA or DVI cable. For instance, a central processing unit (CPU) provides visual information to a graphics processing unit (GPU) that converts the information into pixel values and communicates the pixel values through the cable to the display. The GPU is typically integrated into the chipset of the information handling system or added into the system as a card interfaced with the chipset through an internal bus, such as a PCI Express bus. The presentation of visual information at the display is generally aided with the communication of management information from the display to the information handling system, such as by using the VESA Display Data Channel Standard and Access.bus. For instance, EDID EEPROM loaded on the display provides identification information to aid correct formatting of information at the display by the GPU. The display identification information is communicated through low speed serial links like DDC, essentially an I2C interface. Displays typically have a microcontroller that also presents menus for users to adjust display settings and perform basic error diagnostics.

In some situations, information handling systems experience errors that prevent proper operation of the GPU and, thus, presentation of visual information at a display. For example, errors during system startup prevent the operating system from functioning normally to generated visual information at the CPU. Alternatively, failures of various hardware components prevent the communication of visual information from the CPU to the GPU or other system components. Generally, firmware running in the chipset of the information handling system tracks and identifies such errors. However, communication of the error information from the firmware to a user presents a challenge if the display fails to reach an operational state due to restricted operability of the GPU. Some systems communicate failure codes to identify the source of the failure with LED lights extending from the chipset to the outer housing of the system. Other systems communicate failure codes with varying sounds, such as beeping codes, which play from an internal speaker system. Typically users must contact technical assistance from the manufacturer of the system to interpret such errors codes, resulting in increased costs to the manufacturer and slower error correction for the user.

SUMMARY OF THE INVENTION

Therefore a need has arisen for a system and method which presents error information at an information handling system display through an auxiliary display channel.

In accordance with the present invention, a system and method are provided which substantially reduce the disadvantages and problems associated with previous methods and systems for presenting error information at an information handling system display. Errors identified by system firmware are communicated to the display through an auxiliary channel and presented at the display with images, such as text generated by logic at the display.

More specifically, an error engine running as firmware in the information handling system, such as in the BIOS, detects and identifies errors, such as component failures during startup of the system. The identified error is communicated from the error engine to a display through an auxiliary channel of a display cable, such as a DDC or I2C channel normally used to communicate system management information between the display and the information handling system. An auxiliary channel selector residing in the chipset or a graphics card selectively configures the auxiliary channel to communicate identified errors or management information. An error reporter running on firmware in the display, such as on a microcontroller of the display, receives the identified error and generates an image, such as text, for presentation at the display that describes the identified error.

The present invention provides a number of important technical advantages. One example of an important technical advantage is that textual error messages are presented at an information handling system display even if the normal graphics subsystem is inoperative. An error engine communicates through the auxiliary channel of the display cable so that the operational state of the graphics subsystem does not impede communication of the identified error to the display. For instance, the identified error is communicated to the display cable through the chipset I/O hub using a management bus, such as an SMBus, or a dedicated wire. An auxiliary channel selector configures the auxiliary bus to support error messages or management information as needed without impact on normal system operations.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Error messaging from information handling system firmware to a display through an auxiliary channel allows presentation of textual error messages generated at the display without an operational graphics subsystem on the information handling system. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
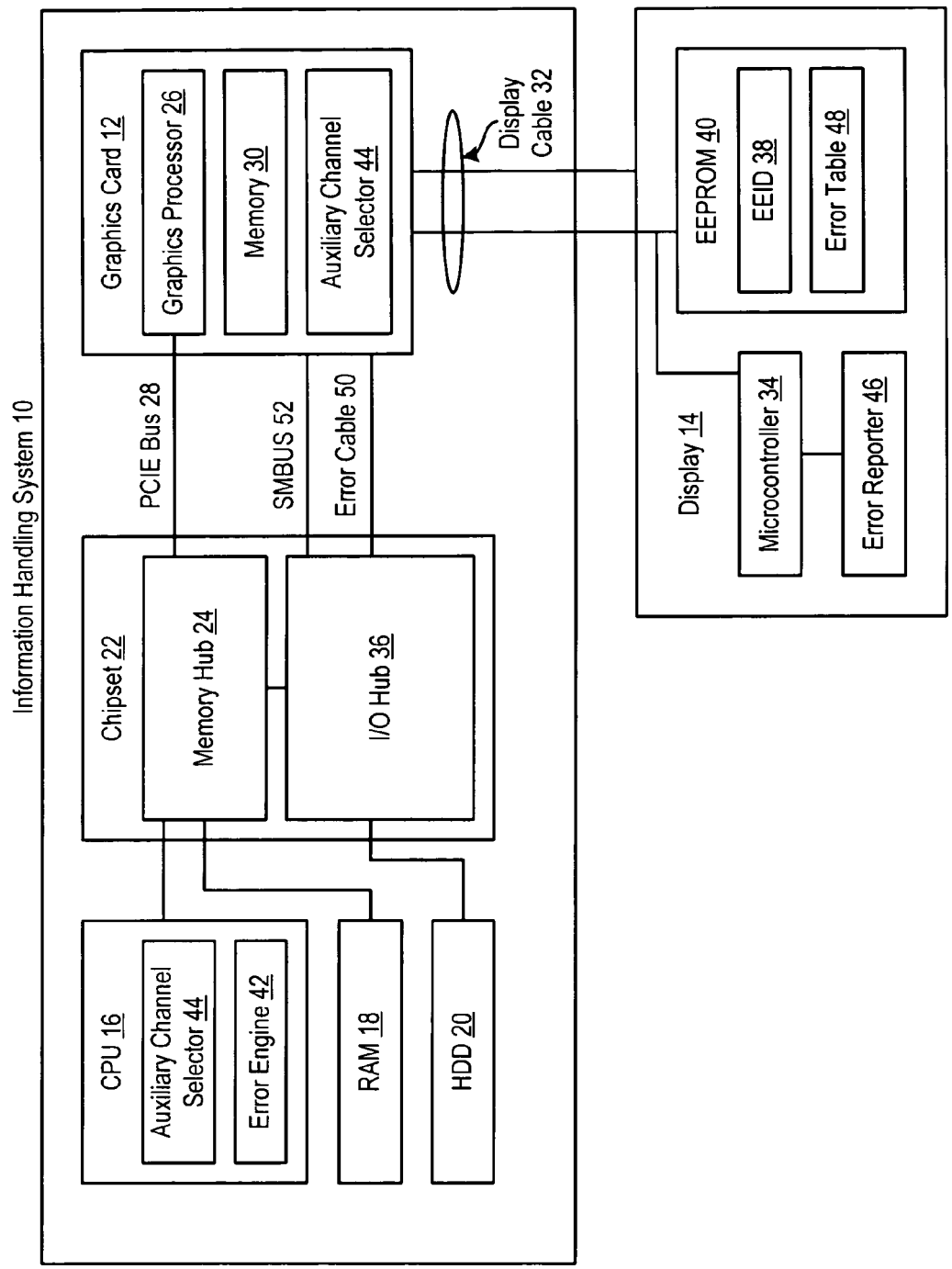
FIG. 1 depicts a block diagram of an information handling system having display auxiliary channel error messaging with an add in graphics card.

Referring now to FIG. 1, a block diagram depicts an information handling system 10 having display auxiliary channel error messaging with an add in graphics card 12. Information handling system 10 generates information for presentation at a display 14 with a variety of processing components, such as CPU 16, RAM 18, a hard disk drive (HDD) 20 and a chipset 22. For instance, during normal operating conditions, applications and an operating system running on CPU 16 generate visual information which is communicated through a memory hub 24 of chipset 22 to display 14 with the visual information formatted for presentation by a graphics processor 26 on graphics card 12. Memory hub 24 communicates the visual information across a PCI Express bus 28 in a digital form so that graphics processor 26 determines the pixel values of the display with the aid of graphics memory 30 and formats these values for communication across a display cable 32, such as a VGA, DVI or HDMI cable. Display 14 receives the visual information and sets the pixel values accordingly.

Chipset 22 manages the interaction of software and hardware processing components of information handling system 10, such as with a BIOS running as firmware on CPU 16. Memory hub 24 distributes values stored in memory to designated components and an I/O hub 36 distributes input and output values to designated components. One function of firmware running on CPU 16 is to perform a startup routine, known as bootstrapping, that brings the processing components of information handling system 10 from a power down state to an operational state. For instance, BIOS firmware instructions initiate hard disk drive 20 to read the operating system for use by CPU 16, which, in turn, coordinates operation of other processing components, such as graphics card 12. During startup of information handling system 10, graphics processor 26 interacts with display 14 to read EEID identification information from EEPROM 40. For instance, a DVI display cable communicates EEID information through a DDC auxiliary channel that uses pins 6 (DDC clock) and 7 (DDC data) of a standard digital DVI interface. As another example, a VGA display cable communicates EEID information through an auxiliary channel that uses pins 12 (SDA) and 15 (SCL) of a standard analog VGA interface. Graphics processor 26 applies the EEID identification information to configure visual information for proper presentation at display 14. Independent of information handling system 10, microcontroller 34 presents menus that allow a user to adjust display characteristics at the display, such as display area, size, color, contrast, brightness and other characteristics.

During startup of information handling system 10, an error engine 42 running as firmware in CPU 16, such as in the BIOS, monitors processing components for proper operation and identifies errors that arise. In the event that the error impedes or prevents the communication of visual information to graphics card 12 or from graphics card 12 to display 14, an auxiliary channel selector 44 selectively configures the auxiliary channel of display cable 32 to communicate the identified error from error engine 42 to microcontroller 34 of display 14. An error reporter 46 running on microcontroller 34 receives the identified error and generates a text message for presentation at display 14 that identifies the error for the user. For instance, error reporter 46 applies the identified error to an error table 48 to retrieve an associated error text message and presents the error text message in a window supported by microcontroller 34. Since error reporter 46 running on microcontroller 34 cooperates to generate the image for the error text message, the error text message is supported even if graphics card 12 is not operating. Alternatively, error engine 42 could simply send a sequence of characters to be rendered by microcontroller 34. Although errors detected in startup are automatically communicated through the auxiliary channel as necessary, in an alternative embodiment, auxiliary channel selector 44 applies communication through the auxiliary channel based on a user input code, such as the selection of a diagnostics mode. Thus, for instance, display of errors with the auxiliary channel helps to distinguish video problems from post-crash situations in which restart of the system changes the state to make intermittent problems difficult to diagnose.

Auxiliary channel selector 44 selectively configures the auxiliary channel of display cable 32 to communicate identified errors from error engine 42 in a variety of ways. In one embodiment, auxiliary channel selector 44 operates as firmware in CPU 16 through I/O hub 36 of chipset 22 and communicates identified errors from error engine 42 through an error cable 50 that merges into display cable 32. In an alternative embodiment, auxiliary channel selector 44 uses a standard management bus 52, such as an SMBus, to communicate the identified error and to coordinate the merging of management and error information through the auxiliary channel of display cable 32. For instance, if an error is detected by error engine 42, a message sent from auxiliary channel selector 44 through SMBus 52 reserves the auxiliary channel so that a subsequent message that identifies the error is communicated through SMBus 52 to display 14 through the auxiliary channel.

Figure 2:
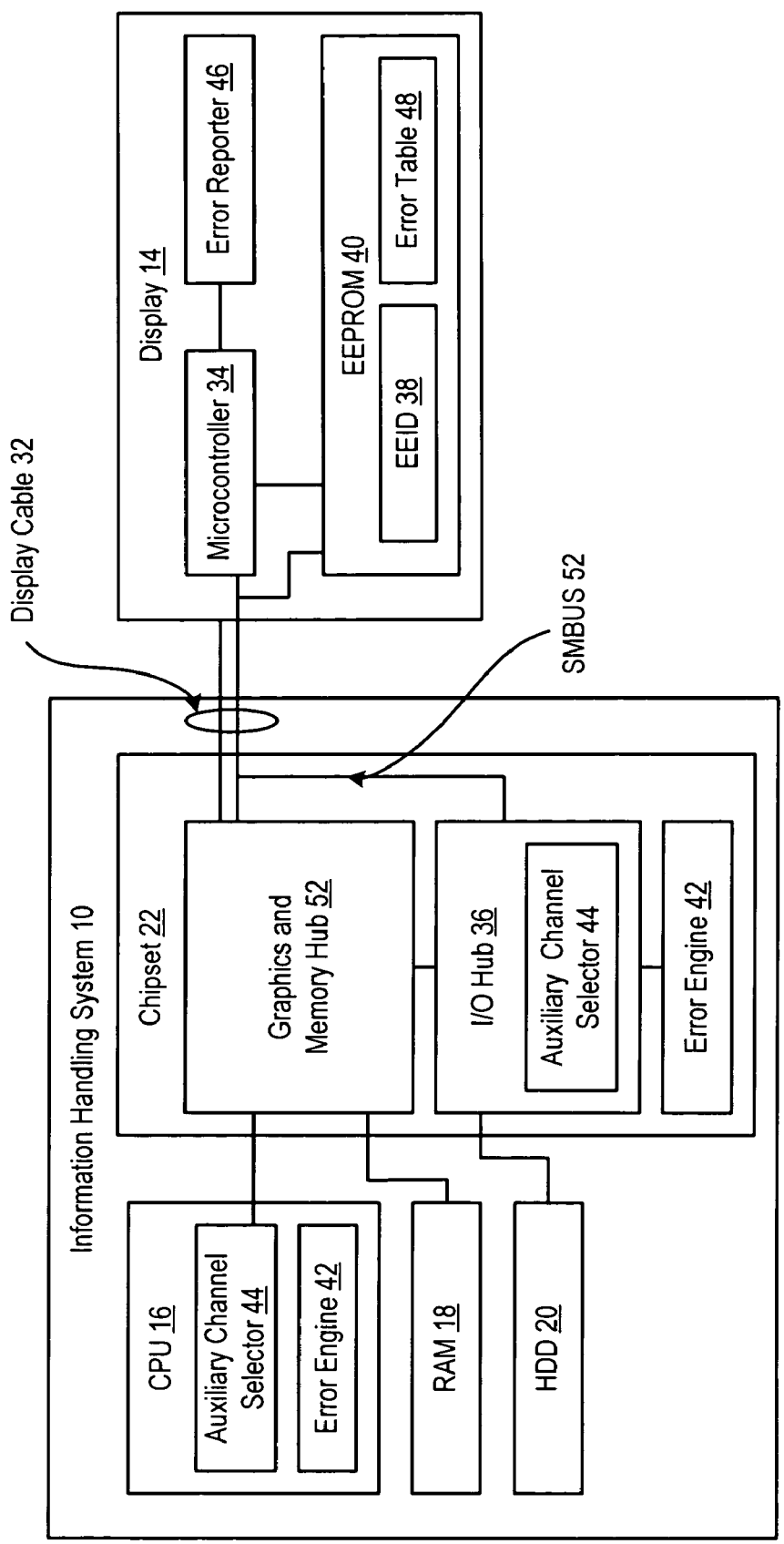
FIG. 2 depicts a block diagram of an information handling system having display auxiliary channel error messaging with integrated graphics.

Referring now to FIG. 2, a block diagram depicts an information handling system 10 having display auxiliary channel error messaging with integrated graphics. A combined graphics and memory hub 52 provides visual information through display cable 32 formatted for presentation at display 14 rather than through a separate add in graphics card. Communication of error information from error engine 42 is supported from either graphics and memory hub 52 or I/O hub 36. As with the embodiment having an add in graphics card, the embodiment of FIG. 2 communicates the identified error to display 14 so that error reporter 46 running on microcontroller 34 can generate an error text message to present to a user. Including auxiliary channel selector 44 as firmware instructions operating through memory hub 52 provides a convenient common location to merge standard and diagnostic modes. Operating auxiliary channel selector 44 through I/O hub 36 is another alternative for communication of identified errors even in the event of failure of graphics and by selectively merging the identified error through a management or other bus, such as SMBus 52. Error engine and channel selector functions have been described in the context of a host processor and chipset, however, in alternative embodiments such functions may be distributed in other processing components, such as a notebook system embedded controller or processors embedded in chipsets and super I/O devices.

Figure 3:
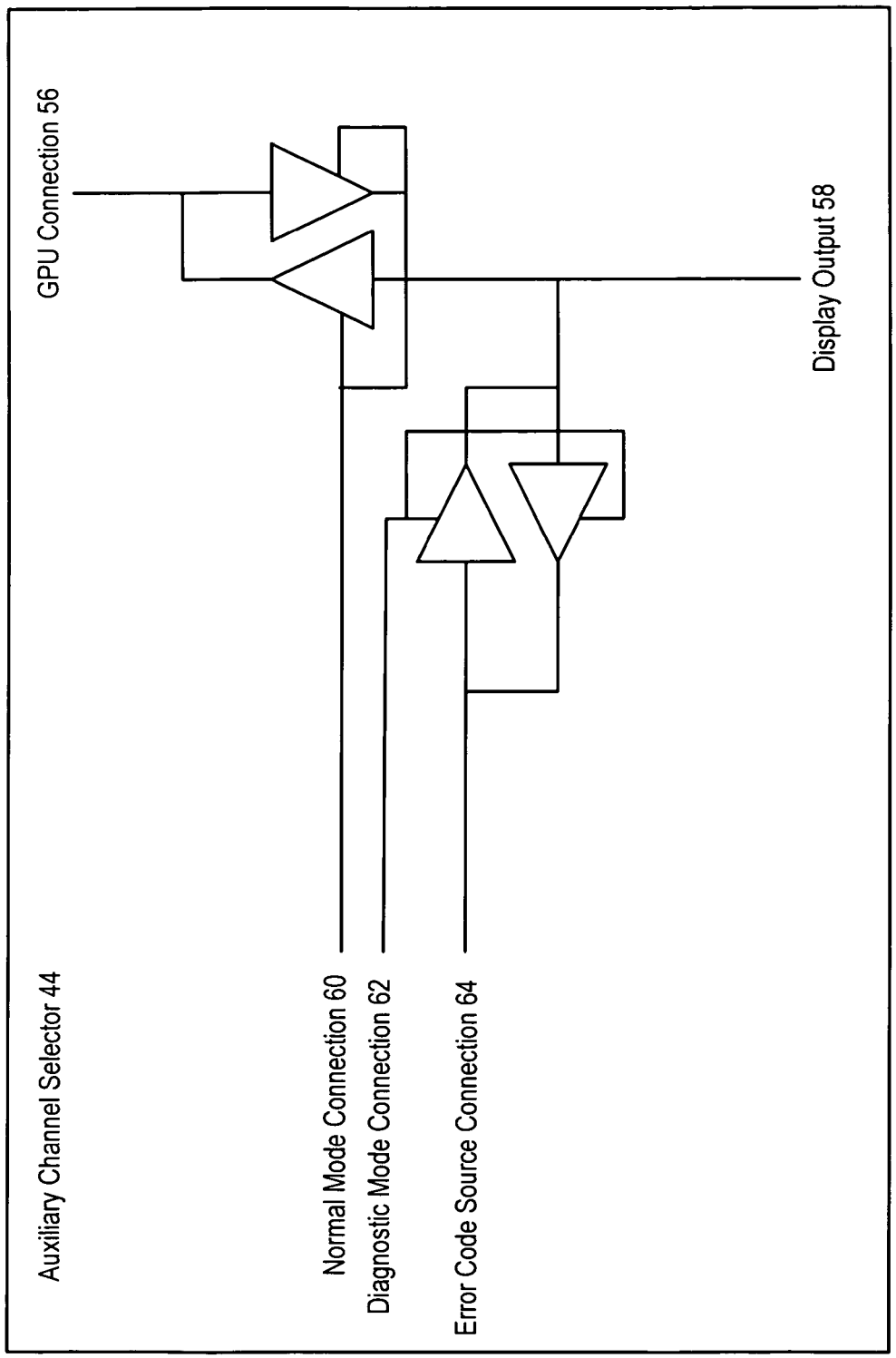
FIG. 3 depicts a circuit diagram of one example of an auxiliary channel selector that selectively communicates display management information or identified errors.

Referring now to FIG. 3, a circuit diagram depicts one example of an auxiliary channel selector 44 that selectively communicates display management information or identified errors. Under normal operating conditions, management information is communicated to GPU connection 56 from display connection 58. If an error is detected by error engine 42, a normal mode input 60 is set to off and a diagnostic mode input 62 is set to on by error engine 42. Once the diagnostic mode is set to on, the identified error is communicated through an error code source input 64 to display connection 58. For instance, the identified error is communicated as a code through a serial management channel of the display cable, such as a DDC connection. Communication of management information through GPU input 56 to display connection 58 is continued by setting the normal mode input 60 to on and setting the diagnostic mode input 62 to off.

Although the present invention has been described in detail, it should be understood that various changes, substitutions and alterations can be made hereto without departing from the spirit and scope of the invention as defined by the appended claims.

What is claimed is:

1. An information handling system comprising:
   plural processing components operable to generate visual information for presentation at a display;
   a display operable to present the visual information;
   an interface operable to communicate information between the processing components and the display;
   a microcontroller disposed in the display and operable to communicate management information from the display to the processing components through an auxiliary channel of the interface;
   an error engine running on one or more of the processing components and operable to identify errors associated with one or more of the processing components and to communicate the errors to the display through the auxiliary channel; and
   an error reporter running on the microcontroller and interfaced with the error engine through the auxiliary channel, the error reporter operable to present the errors at the display.

2. The information handling system of claim 1 wherein the interface comprises a DVI cable and the auxiliary channel comprises a DDC channel.

3. The information handling system of claim 1 wherein the interface comprises a VGA cable.

4. The information handling system of claim 1 wherein the management information comprises identification information stored on the display.

5. The information handling system of claim 1 wherein the processing components comprise a chipset having an integrated graphics processor and the error engine comprises firmware operating on the graphics processor.

6. The information handling system of claim 1 wherein the processing components comprise a CPU and the error engine comprises firmware operating on the CPU.

7. The information handling system of claim 1 wherein the processing components comprise a chipset having an integrated graphics processor and the error engine comprises firmware operating on the chipset, the information handling system further comprising an auxiliary channel selector operable to selectively configure the auxiliary channel to communicate information between the display and the graphics processor or between the error engine and error reporter.

8. The information handling system of claim 1 wherein the processing components comprise a chipset having the error engine operating as firmware, a graphics card having a graphics processor, and a management bus communicating management information to the graphics card, the information handling system further comprising an auxiliary channel selector operable to selectively configure the auxiliary channel operable to selectively communicate information between the display and the graphics processor or between the error engine and error reporter, the auxiliary channel selector managing the communication on the auxiliary channel through the management bus.

9. The information handling system of claim 1 wherein the processing components comprise a chipset having the error engine operating as firmware and a graphics card having a graphics processor connected to the cable, the information handling system further comprising an auxiliary channel selector operable to selectively interface the error engine with the cable between the graphics processor and the display.

10. A method for presenting error messages at an information handling system display, the method comprising:
    detecting an error at the information handling system, the error restricting communication of visual information at the display;
    identifying the error with firmware running on the information handling system;
    communicating the identified error from the firmware to a microcontroller of the display through an auxiliary communication channel; and
    presenting the identified error at the display from the microcontroller.

11. The method of claim 10 wherein presenting the identified error comprises generating a text message for presentation at the display with a processor running on the display.

12. The method of claim 10 wherein identifying the error with firmware further comprises identifying the error with a BIOS running on a processor of the information handling system.

13. The method of claim 10 wherein the auxiliary communication channel comprises a DDC channel of a DVI cable connecting the information handling system to the display.

14. The method of claim 10 wherein the auxiliary communication channel comprises an HDMI cable connecting the information handling system to the display.

15. The method of claim 10 wherein the error comprises a failure that compromises the operation of a graphics card, and wherein communicating the identified error further comprises communicating the identified error from the firmware to the auxiliary channel through a management bus interfacing the firmware and the graphics card.

16. The method of claim 15 wherein the management bus comprises an SMBus.

17. A system for presenting error messages at an information handling system display, the system comprising:
- an error engine running as firmware and operable to identify an error with a component of the information handling system;
- an error reporter running on a microcontroller of the display and operable to receive error identified by the error engine and generate an error text at the display; and
- an auxiliary channel selector operable to selectively interface the error engine and error reporter through a display cable if predetermined conditions exist.

18. The system of claim 17 wherein the predetermined conditions comprise an error identified by the error engine and a failure to present information at the display with a graphics processor of the information handling system.

19. The system of claim 17 wherein the display cable comprises a DVI cable and the auxiliary channel selector selectively interfaces the error engine and error reporter through a DDC channel.

20. The system of claim 17 wherein the display cable comprises a VGA cable an the auxiliary channel selector selectively interfaces the error engine and error reporter through an I2C channel.

21. The system of claim 17 wherein the error reporter comprises firmware operating in a chipset of the information handling system.

* * * * *